Nov. 5, 1935.   F. FISCHER ET AL   2,019,698
DEVICE FOR ILLUMINATING LENTICULATED FILMS
FROM THE SIDE OF THE PHOTOGRAPHIC LAYER
Filed Sept. 23, 1932   2 Sheets-Sheet 1
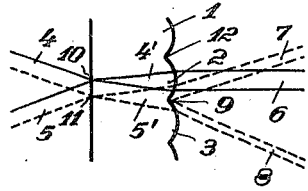
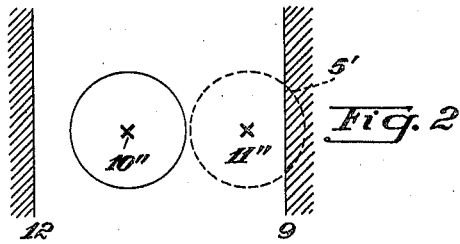
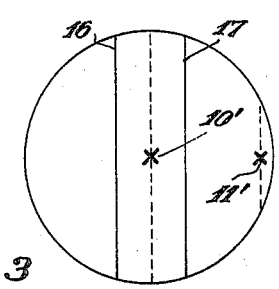
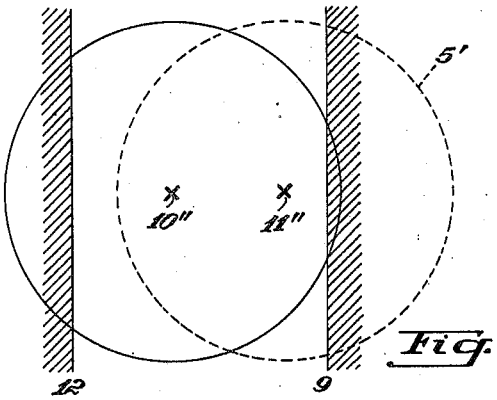
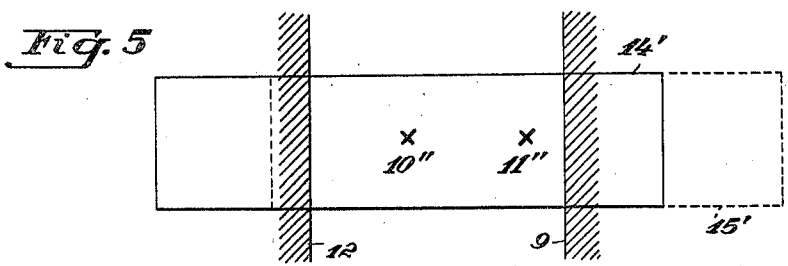
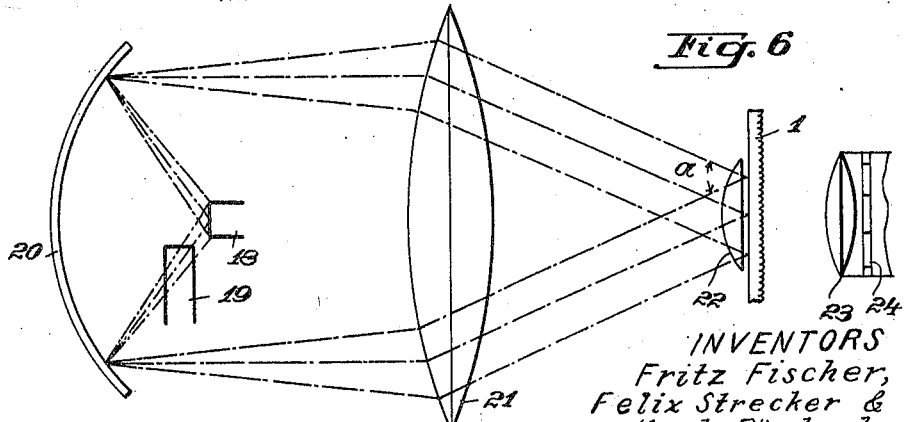
INVENTORS
Fritz Fischer,
Felix Strecker &
Kurt Räntsch
BY
ATTORNEYS Nov. 5, 1935.   F. FISCHER ET AL   2,019,698
DEVICE FOR ILLUMINATING LENTICULATED FILMS
FROM THE SIDE OF THE PHOTOGRAPHIC LAYER
Filed Sept. 23, 1932   2 Sheets-Sheet 2
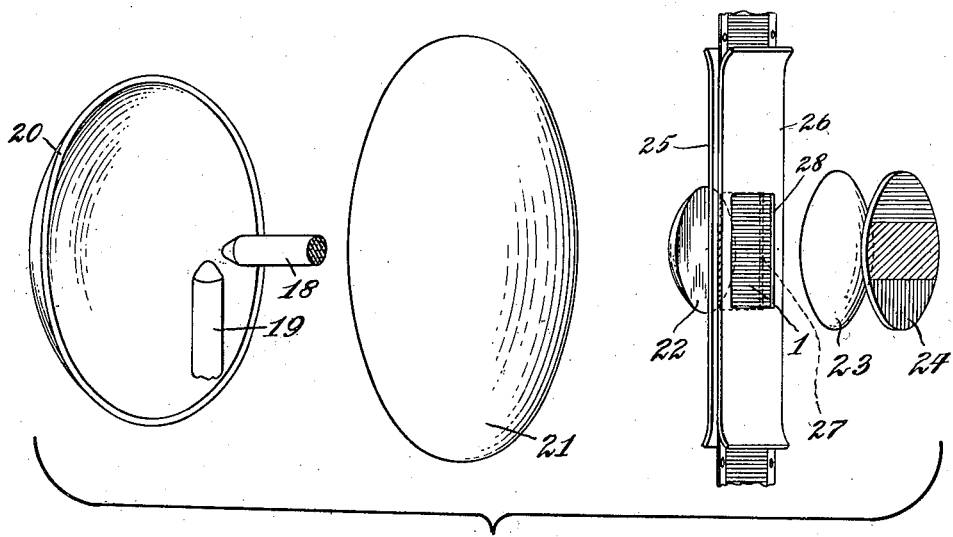
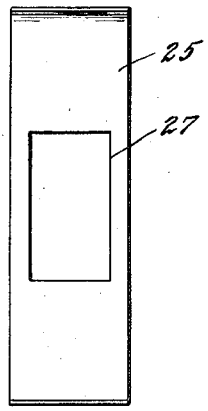
INVENTORS.
Fritz Fischer
Felix Strecker
BY Kurt Rantsch
Gifford, Scull & Burgess
ATTORNEYS.

Patented Nov. 5, 1935

2,019,698

UNITED STATES PATENT OFFICE 2,019,698

DEVICE FOR ILLUMINATING LENTICULATED FILMS FROM THE SIDE OF THE PHOTOGRAPHIC LAYER

Fritz Fischer, Berlin-Charlottenburg, Felix Strecker, Berlin-Siemensstadt, and Kurt Räntsch, Teltow-Seehof, near Berlin, Germany, assignors to Siemens & Halske, Aktiengesellschaft, Siemensstadt, near Berlin, Germany, a corporation of Germany Application September 23, 1932, Serial No. 634,532
In Germany September 26, 1931

4 Claims. (Cl. 88—16.4)

The invention relates to a device for illuminating lenticulated films from the side of the photographic layer. It can be used both for projecting and copying purposes.

An advantage obtained by the invention is that the aperture of the projecting objective can be fully utilized without running the risk that one of the filter colours predominates. Another advantage is that those portions of the photographic layer on which the marginal zones of the colour filter are imaged by the lenticular elements, are more fully utilized in the copying and projecting process.

The object of the invention is that the angular aperture of the light cone impinging on the film is at least equal to the relative opening of the lenticular elements. Preferably the angular aperture of the light cone should be twice as large as the relative opening of the lenses.

The size of the angular aperture of the light cone striking the film must fulfil the indicated condition for all directions, if lenticular elements are present on the film. If, however, the film has cylindrical lenses, the indicated size ratio condition must be fulfilled only for the direction vertical to the direction of the lenticular elements The figures will explain the new device.

Fig. 1 shows a section through part of a lenticulated film.

Figs. 2, 4 and 5 show the plan-view of part of the film.

Fig. 3 represents the colour filter arranged within an objective.

Fig. 6 shows a section through a projecting device according to the invention.

Fig. 7 is a perspective view of the system appearing in Fig. 6;

Fig. 8 is a view of one of the plates forming a film gate in Fig. 7.

In Fig. 6, 1 designates the film to be projected. The light emanates from the arc burning between the carbons 18 and 19. It is collected by the mirror 20 and projected on the condenser lens 21, which refracts the light so as to enable it to pass through the film at the illuminated spot. In front of the film, there may be located the lens 22, imparting at every spot the same angle of incidence to the light rays. On the lenticulated side of the film, provision is made for the objective 23, associated with the colour filter 24.

The size of the light source, of the mirror 20 and of lens 21 is such that the angle marked $a$ is at least equal to the relative aperture of the lenticular elements on the film. Preferably the angle $a$ should be double the size of this relative aperture.

Reference will be made at first to Fig. 1 in order to explain the advantages.

In this figure 1 represents the lenticulated film, of which more particularly the lenses 2 and 3 will be considered. A comparison will be made of the two points 10 and 11 of the light-reactive layer of which one is situated behind the center of lens 2 and the other nearer to the margin behind the same lens. Both are stricken in the projecting process by light cones of equal size of which one is designated in the figure by 4 and the other by 5. These light cones are decreased by refraction when entering the film and constitute the cones 4' and 5'. While the whole amount of light filling cone 4' strikes lens 2 and leaves the film as a light brush 6 of almost parallel rays, part of the rays filling cone 5' strikes lens 2 and another part lens 3. The former part is refracted by lens 2, in such a manner that it passes as a light brush 7 through the correct zone of the colour filter within the objective. Part 8 of the light brush which is refracted by lens 3 is, however, shaded and does not participate in the projection, since the aperture of the projecting objective or its effective diaphragm coincides with the relative opening of the lenticulations. It is evident therefrom that point 10 is projected with a materially larger relative aperture than point 11.

This is also seen in Fig. 2. It represents an image which would be seen if the goffered side of the film could be looked at in the direction of the light rays. 9 and 12 are the edges at which the lenticular element 2 is limited laterally. The light passing through the film beyond these edges is lost for the projection of the image elements lying behind lens 2. The circle 4' having the center 10" and corresponding to the light brush 4' is located altogether between the edges 9 and 12, whereas the circle 5' having the center 11" and corresponding to the cone 5', is only partly located between the edges 9 and 12. Hence the ratio of the light intensities, with which points 10 and 11 are projected, results from the ratio of the portions of the circles under consideration which lie between the edges 9 and 12.

In order to enable the parts of the photographic layer lying in the neighbourhood of the edges of the lenticular elements as well as the intermediate parts to be fully utilized in the projection process, it is therefore necesary to make the angular aperture of the light cone striking the film sufficiently large. An example hereof is shown in Fig. 4, in which the circles 4' are materially larger than is shown in Fig. 2. It will be seen that the ratio of the light passing through point 10 and the lenticular element lying in front of it, to the light passing through point 11 and the lenticular element located in front of it approximate 1 the more, the larger circle 4', i. e. the illuminating cone. In the dimensioning of the angular aperture shown in Fig. 4, in particular, the ratio of the two amounts of light indicated above is, also for such points as are located in the immediate neighbourhood of the margin, only slightly inferior to that for points lying nearer to the center. Contrary thereto this ratio strongly decreases towards the margin in the case shown in Fig. 2. A satisfactory uniformity in the uitlization of the various points, located behind the lenticular elements, is obtained, if the angular aperture of the light cones striking the film is at least equal to the relative aperture of the lenticular elements. Thus in this case, the diameter of circle 4' is equal to the distance between the two edges 9 and 12. Preferably this circle 4' is, however, made larger, so as to have a diameter which is twice as great as the distance between the edges 9 and 12. In this case, the angular aperture of the light cone is twice as large as the relative opening of the lenticular elements.

The best uniformity is obtained by the use of films having cylindrical lenticulations, if, in addition, the light cone is given a rectangular cross-section. This case is shown in Fig. 5. The light brush passing through point 10 of the film is limited by the rectangle 14', whereas the light brush passing through point 11 is enclosed in the rectangle 15'. Of both rectangles, an equally great portion is located between the edges 9 and 12, to the effect, that points 10 and 11 are projected with the same amount of light.

In Fig. 7 we have shown one way of obtaining the rectangular light beam, this being done by passing the film 1 through a film gate formed by plates 25 and 26, each of which has a rectangular aperture 27 and 28, respectively, through which the light may pass. In this particular form, the lenticulations of the film are shown as being arranged transversely thereof, although it will be understood by those skilled in the art that they may be arranged lengthwise of the film without departing from the invention.

A further limitation of rays may be noticed in case of a circular objective aperture. This will be explained with the aid of Fig. 3. The objective aperture is divided into three different colour zones by means of the separating lines 16 and 17. Point 10 on the film emits its light through the entire stria indicated in the objective by the line passing through point 10'. The light striking point 11 passes only through the materially shorter line, passing through point 11'. This holds good both for the taking and for the projecting process and should also be observed in the projection copy. The fault due to this limitation of rays can then be avoided by the choice of a rectangular aperture of the objective. If a circular aperture of the objective is used, the marginal zones must for balancing purposes be made correspondingly wider than the intermediate zones of the filter. Since the use of a device according to the invention enables the marginal zones to be materially better utilized than in the devices known up to the present, these zones, as compared with the intermediate zone, may be made narrower than in the older devices. This results in a considerable gain in light. In the new device it is in addition no longer necessary partly to smooth out the intermediate zone of the filter in the projection process, since a predominance of the colours corresponding to this zone need no longer be taken into account. Hence the entire aperture of the projection objective will be fully utilized.

We claim as our invention:

1. In combination, a light source, a lenticulated film, and optical means adapted to project light from said source upon said film, said optical means having an angular aperture, on the side thereof nearest said film, which is at least twice as great as the aperture of one of the lenticulations of the film.

2. In combination, a light source, a lenticulated film, and optical means adapted to project light from said source upon said film, said optical means having an angular aperture, on the side thereof nearest said film, which is approximately twice the aperture of one of the lenticulations of the film.

3. In combination, a light source, a lenticulated film, optical means adapted to project light from said source upon said film, said optical means having an angular aperture, on the side thereof nearest said film, which is approximately twice the aperture of one of the lenticulations of the film, and means giving the beam of light passing from said optical means to said film a rectangular cross-section.

4. In combination, a light source, a lenticulated film, optical means adapted to project light from said source upon said film, said optical means having an angular aperture, on the side thereof nearest said film, which is approximately twice the aperture of one of the lenticulations of the film, and means giving the beam of light passing from said optical means to said film a rectangular cross-section, the lenticulations on the film being cylindrical, and the rectangle having a greater dimension perpendicular to the lenticulations than parallel therewith.

FRITZ FISCHER.
FELIX STRECKER.
KURT RÄNTSCH.